(12) United States Patent
Sprague et al.

(10) Patent No.: US 10,437,042 B2
(45) Date of Patent: Oct. 8, 2019

(54) ENHANCEMENT OF OUTPUT OF OPTICALLY PUMPED PHOSPHOR BY USE OF SURFACE NANOSTRUCTURES

(71) Applicant: Materion Corporation, Mayfield Heights, OH (US)

(72) Inventors: Robert Sprague, Acton, MA (US); Michael P. Newell, Groton, MA (US)

(73) Assignee: MATERION CORPORATION, Mayfield Heights, OH (US)

(*) Notice: Subject to any disclaimer, the term of this patent is extended or adjusted under 35 U.S.C. 154(b) by 158 days.

(21) Appl. No.: 15/429,600

(22) Filed: Feb. 10, 2017

(65) Prior Publication Data

US 2017/0235127 A1   Aug. 17, 2017

Related U.S. Application Data

(60) Provisional application No. 62/294,526, filed on Feb. 12, 2016.

(51) Int. Cl.
*G02B 26/00* (2006.01)
*B29C 45/00* (2006.01)
(Continued)

(52) U.S. Cl.
CPC ........ *G02B 26/008* (2013.01); *B29C 45/0001* (2013.01); *B29C 45/372* (2013.01); *C09K 11/025* (2013.01); *F21V 7/22* (2013.01); *F21V 13/02* (2013.01); *B29K 2083/00* (2013.01); *B29K 2995/0035* (2013.01); *G02B 2207/113* (2013.01); *G03B 21/204* (2013.01)

(58) Field of Classification Search
CPC ............ G02B 26/008; G02B 2207/113; G02B 1/118; B29C 45/372; B29C 45/0001; H04N 9/3161; H04N 9/3158; H04N 9/3111; F21V 9/30; F21V 7/22; F21V 13/02; F21V 13/3161; C09K 11/025; C09K 11/08; B29K 2995/0035; B29K 2083/00; G03B 21/204; G03B 33/08
See application file for complete search history.

(56) References Cited

U.S. PATENT DOCUMENTS

2009/0080075 A1    3/2009  Ho et al.
2010/0117108 A1*   5/2010  Gaebler ................ B82Y 20/00
                                               257/98
(Continued)

FOREIGN PATENT DOCUMENTS

JP   2012-108435   11/2010
JP   2012-247625   12/2012

OTHER PUBLICATIONS

Machine English Translation of JP2012247625A, Udagawa et al., Dec. 13, 2012.*

(Continued)

*Primary Examiner* — Bao Q Truong
*Assistant Examiner* — Glenn D Zimmerman
(74) *Attorney, Agent, or Firm* — Fay Sharpe LLP

(57) ABSTRACT

Phosphor elements comprising phosphors in a host material having a phosphorescence-emitting surface with surface nanostructures are disclosed. Phosphor wheels having such phosphor elements, methods of making such phosphor elements, and methods of using such phosphor elements are also disclosed.

19 Claims, 5 Drawing Sheets

(51) Int. Cl.
    *B29C 45/37*    (2006.01)
    *C09K 11/02*    (2006.01)
    *F21V 7/22*    (2018.01)
    *F21V 13/02*    (2006.01)
    *B29K 83/00*    (2006.01)
    *G03B 21/20*    (2006.01)

(56) References Cited

U.S. PATENT DOCUMENTS

| | | | |
|---|---|---|---|
| 2011/0025951 A1* | 2/2011 | Jones | H01L 33/50 349/70 |
| 2012/0106126 A1 | 5/2012 | Nojima et al. | |
| 2013/0056775 A1* | 3/2013 | Kawakami | G02F 1/00 257/98 |
| 2016/0010826 A1* | 1/2016 | Tsukatani | F21S 48/2218 362/510 |

OTHER PUBLICATIONS

Machine English Translation of JP2012108435A, Kobayashi, Jun. 7, 2012.*
International Search Report and Written Opinion for International Application No. PCT/US2017/017380 dated Apr. 26, 2017.

* cited by examiner

ENHANCEMENT OF OUTPUT OF OPTICALLY PUMPED PHOSPHOR BY USE OF SURFACE NANOSTRUCTURES

CROSS-REFERENCE TO RELATED APPLICATIONS

This application claims priority to U.S. Provisional Patent Application Ser. No. 62/294,526, filed Feb. 12, 2016, which is hereby fully incorporated by reference.

BACKGROUND

The following relates to the phosphor arts, wavelength conversion arts, and related arts, and to optoelectronic, photonic, and like applications using same such as (but not limited to) projection displays (e.g. digital light processing, DLP), automotive lighting, and so forth.

Phosphor elements are known for converting light wavelength, usually down-converting from a shorter wavelength to one or more longer wavelengths. In a common approach, phosphor materials are dispersed in a transparent or translucent binder material such as epoxy, silicone, or so forth, which is then cured to form a solid phosphor element. The phosphor element is energized, or "pumped" by a laser, light emitting diode (LED), or other pump light source to emit phosphorescence. The phosphor element may be static, i.e. not moving during operation. In another application, the phosphor element is mounted near the outer rim of a rotating wheel (i.e. a phosphor wheel device), which effectively distributes heating from the pump beam over a larger area. A phosphor wheel device also advantageously can provide a time sequence of different colors (or more generally different phosphorescence spectra) by using different phosphors in different phosphor elements (i.e. different arc segments) disposed along the rim of the phosphor wheel. Periods of zero emission can also be provided by leaving arced gaps between neighboring phosphor arc segments. Such a phosphor wheel can be used, for example, to provide sequential red, green, and blue light for a Digital Light Processing (DLP) projector or other DLP display device.

Some improvements are disclosed herein.

BRIEF DESCRIPTION OF THE DRAWINGS

FIGS. 4 and 5 diagrammatically show alternative embodiments of the surface nanostructures.

DETAILED DESCRIPTION

Figure 1:
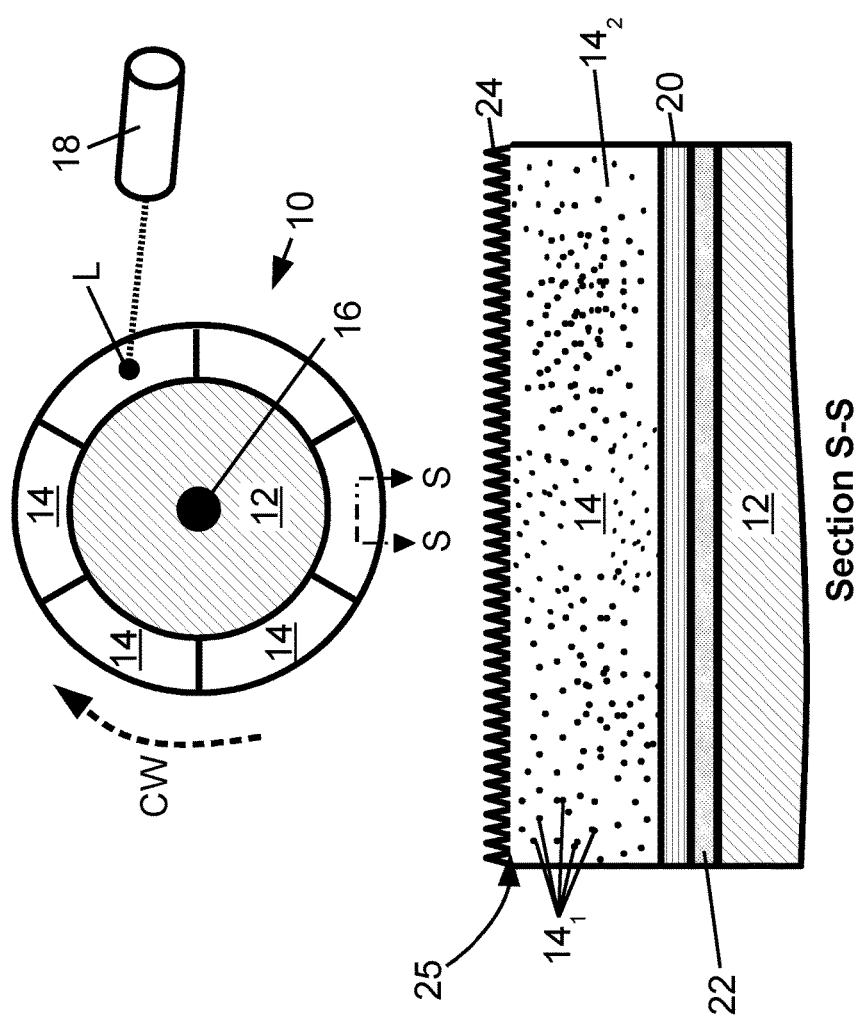
FIG. 1 diagrammatically illustrates a phosphor wheel device including six phosphor elements in the form of arc segments disposed along the rim. Section S-S of FIG. 1 shows a cross-section of a portion of one of the phosphor elements including surface nanostructures to enhance phosphorescence light output.

As used herein, and as is conventional in the art, terms such as "optical spectrum", "optical", "wavelength", "frequency", "light", "light beam", and so forth are not limited to the visible spectrum but rather for a given filter may extend into, or reside entirely within, the infrared and/or ultraviolet spectral regions.

Use of a phosphor element necessarily introduces optical losses into the (phosphorescence) light generation system, such as pump beam reflection losses at the surface of the phosphor element and absorption of the pump beam and phosphorescence inside the phosphor element. Pump beam reflection losses can generally be compensated by increasing the pump beam power (e.g., running a pump laser at higher optical power output). However, losses after the wavelength conversion by the phosphor are more difficult to compensate. This is because of a phenomenon known as phosphor quenching, in which the phosphorescence reaches a peak at a certain pump beam power above which the phosphorescence output decreases with further increase in optical pump power. Phosphor quenching is believed to be due at least in part to heating effects and can be limited by improved heat sinking of the phosphor element; nonetheless, for a given heat sinking arrangement phosphor quenching imposes an upper limit on the phosphorescence intensity that can be generated inside the phosphor element.

To further improve the external phosphorescence output, it is known to dispose an anti-reflection (AR) coating onto the surface of the phosphor element. The AR coating reduces phosphorescence reflection losses at the surface thus raising the external phosphorescence output to a level closer to the internal phosphorescence level.

However, it is recognized herein that the use of an AR coating can be problematic for certain types of phosphor elements. An AR coating is most effective when applied to a hard, smooth surface. In the case of host materials such as silicone formed by injection molding, the surface may be porous, have low hardness (colloquially, "soft"), have poor chemical compatibility with the AR coating material, and/or have relatively high roughness. These factors can lead to poor AR coating adhesion to the surface of the phosphor element, and/or can lead to the resulting AR coating being non-uniform with poor flatness leading to degraded anti-reflection performance.

In embodiments disclosed herein, phosphorescence reflection losses are reduced by way of engineered surface nanostructures disposed at the phosphorescence emission surface of the phosphor element. In illustrative embodiments, these surface nanostructures are generally conical in shape and have lateral dimensions less than the wavelength of the phosphorescence light. In the presence of such surface nanostructures, the phosphorescence light interacts with the interface not as an abrupt refractive index change from $n_e$ of the phosphor element to $n_0=1.00$ of air; but rather as a gradual change in effective refractive index that gradually changes from $n_e$ to 1.00 over the height of the surface nanostructures. In general, higher surface nanostructures provide a more gradual effective transition from $n_e$ to 1.00, and provide an enhanced phosphorescence transmission over a larger bandwidth.

For light in the near-ultraviolet, visible, or near-infrared range, the free space wavelength is on the order of 300 nm to 1-2 microns. Appropriate nanostructure lateral dimensions are therefore on the order of tens to hundreds of nanometers (i.e. hundredths to tenths of a micron). Such surface nanostructures are readily fabricated by a wide range of manufacturing approaches, such as photolithography, laser writing, chemical etching, or so forth. In some embodiments in which the phosphor element is manufactured by injection molding, the surface nanostructures are fabricated integrally during the injection molding by incorporating the surface nanostructures into the mold. Thus, the surface nanostructures can be manufactured by low-cost and high-throughput techniques.

Indeed, low hardness of the host material can simplify formation of the surface nanostructures; whereas, low hardness can make AR coating deposition difficult or impossible. Similarly, surface porosity or roughness at scales smaller than the engineered surface nanostructures actually promote the desired gradual transition of the effective refractive index; whereas, such porosity or roughness is problematic for depositing a smooth and uniform AR coating. Still further, AR coating adhesion issues are eliminated by using the disclosed surface nanostructures to promote phosphorescence light coupling out of the phosphor element.

With reference now to FIG. 1, an illustrative phosphor wheel device 10 includes a metal disk or "wheel" 12 made of copper, a copper alloy, an aluminum alloy, or so forth. One or more phosphor elements 14 are attached to an outer perimeter of the wheel 12, that is, are attached at or near the outer rim of the wheel 12. The illustrative phosphor elements 14 have the form factor of arc segments so as to comport with the circular rim of the phosphor wheel 10; however, it is to be understood that this is an illustrative application and more generally the phosphor element may have any form factor, and may be used either in a phosphor wheel or as a static phosphor element. The illustrative phosphor wheel 10 includes six phosphor elements 14 of equal size; however, more or fewer phosphor elements can be employed (including as few as a single annular phosphor element encompassing the entire 360° of the wheel rim). While the illustrative six phosphor elements 14 are commonly illustrated and labeled, it will be appreciated that different phosphor elements can include different phosphors (for example, to emit phosphorescence of different colors), and/or there may be gaps between neighboring phosphor elements (arc segments). In operation the metal wheel 12 is rotated about a central axis 16, for example, by connecting a motor shaft of a motor (not shown) to the central axis 16 and operating the motor to rotate the phosphor wheel 10 in an illustrated clockwise direction CW (counterclockwise rotation is also contemplated). Simultaneously with the rotation, pump light is applied to a local region—this is diagrammatically indicated in FIG. 1 by a laser 18 applying an illustrative pump laser beam spot L. As the metal wheel 12 rotates it carries the phosphor elements 14 in sequence into contact with the laser beam L to emit phosphorescence. It will be readily appreciated that by suitable selection of the phosphors of the various phosphor elements 14, various color time sequences can be generated, such as red-green-blue-red-green-blue as may be appropriate in a DLP display application. While a pump laser 18 is illustrated, the pump beam L may be generated by another light source such as a light-emitting diode (LED), halogen lamp with focusing optics, or so forth.

With continuing reference to FIG. 1, Section S-S diagrammatically illustrates a cross-section of a portion of one phosphor element 14 and its attachment to the metal wheel 12. It is noted that layer thicknesses and lateral dimensions are not drawn to scale in diagrammatic Section S-S of FIG. 1 (or in other drawings herein). The phosphor element 14 comprises phosphor particles $14_1$ (e.g. one or more phosphor powders; also referred to herein as "phosphor") such as (by way of non-limiting illustration) yttrium aluminum garnet (YAG), cerium-doped YAG (YAG:Ce), lutetium YAG (LuYAG), silicate-based phosphors, silicon-aluminum-oxynitride (SiAlON) phosphors, or so forth, embedded in (i.e. dispersed in) a host material $14_2$ that is suitably optically transmissive for both the pump beam and the phosphorescence. Some suitable host materials include silicone, a transparent or translucent thermoplastic resin, or so forth. As is known in the art, these illustrative host materials are readily injection molded to form the phosphor elements 14 of a desired shape defined by the mold. In general, the host material $14_2$ defines the shape of the phosphor element 14.

Optionally, one or more backside reflective coatings 20 may be applied to the back surface of the phosphor element 14. For example, the reflective coating 20 may be a dielectric or metal or hybrid dielectric/metal mirror coating 20. (The term "front-side" as used herein denotes the side of the phosphor element 14 at which phosphorescence is emitted, while the term "back-side" as used herein denotes the side of the phosphor element 14 which is attached to the heat sink 12 (where, again, in the illustrative example the metal wheel 12 of the phosphor wheel 10 serves as the heat sink for the phosphor element 14). In the illustrative embodiment the pump beam L is also applied to the front-side, which is generally a convenient arrangement; however, it is alternatively contemplated to apply the pump beam from the backside, e.g. through an opening in the supporting heat sink. The dielectric mirror coating 20 is designed to reflect the phosphorescence, and optionally is also designed to reflect the pump beam L. The reflective coating(s) 20 may be applied by sputter deposition, thermal evaporation, spray coating, or so forth. It is also contemplated to omit the reflective coating(s) 20, and/or to provide other optical coatings such as a wavelength-selective filter coating, a light-scattering coating, a Fresnel lens, or so forth.

The phosphor element 14 (including the optional backside reflective coating 20) is bonded to the heat sink 12 (e.g. the illustrative metal wheel 12) by a suitable bonding material 22. Some contemplated bonding materials include epoxy, glue, solder, adhesive silicone (optionally a reflective silicone material including dispersed light-reflective particles such as dispersed alumina particles), or so forth. If the bonding material 22 is sufficiently reflective for the phosphorescent light (e.g. reflective silicone), then it is contemplated to omit the separate reflective coating 20 as the bonding material 22 may serve the function of providing backside reflection to enhance light output efficiency. In the case of soldering, a solderable metal stack (not shown) may be deposited on the backside of the phosphor element 14 (or on the backside of the reflective coating 20 if provided) to promote effective soldering. It is also contemplated to substitute a mechanical fixture (not shown) for securing the phosphor element 14 to the heat sink, in which case the bonding material 22 may be omitted or replaced by a thermally conductive paste or the like to provide improved thermal transfer to the heat sink.

Figure 2:
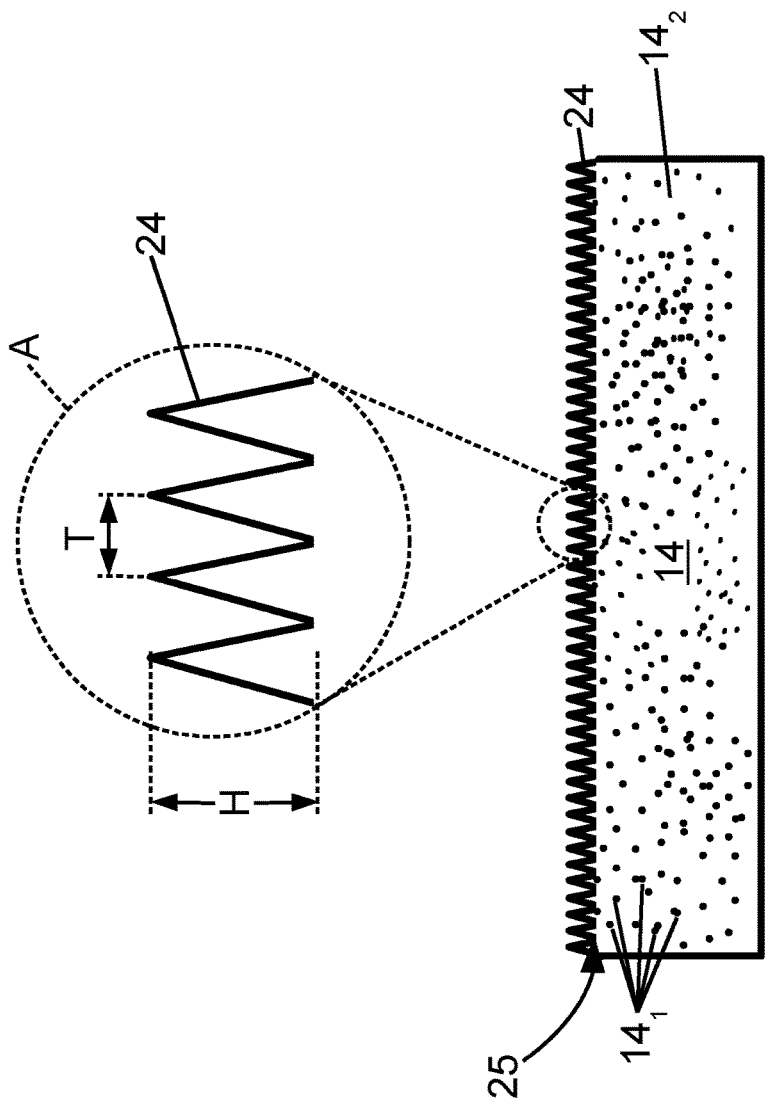
FIG. 2 diagrammatically shows an isolation view of the phosphor element of Section S-S of FIG. 1, with an enlarged view of several of the surface nanostructures.
Figure 3:
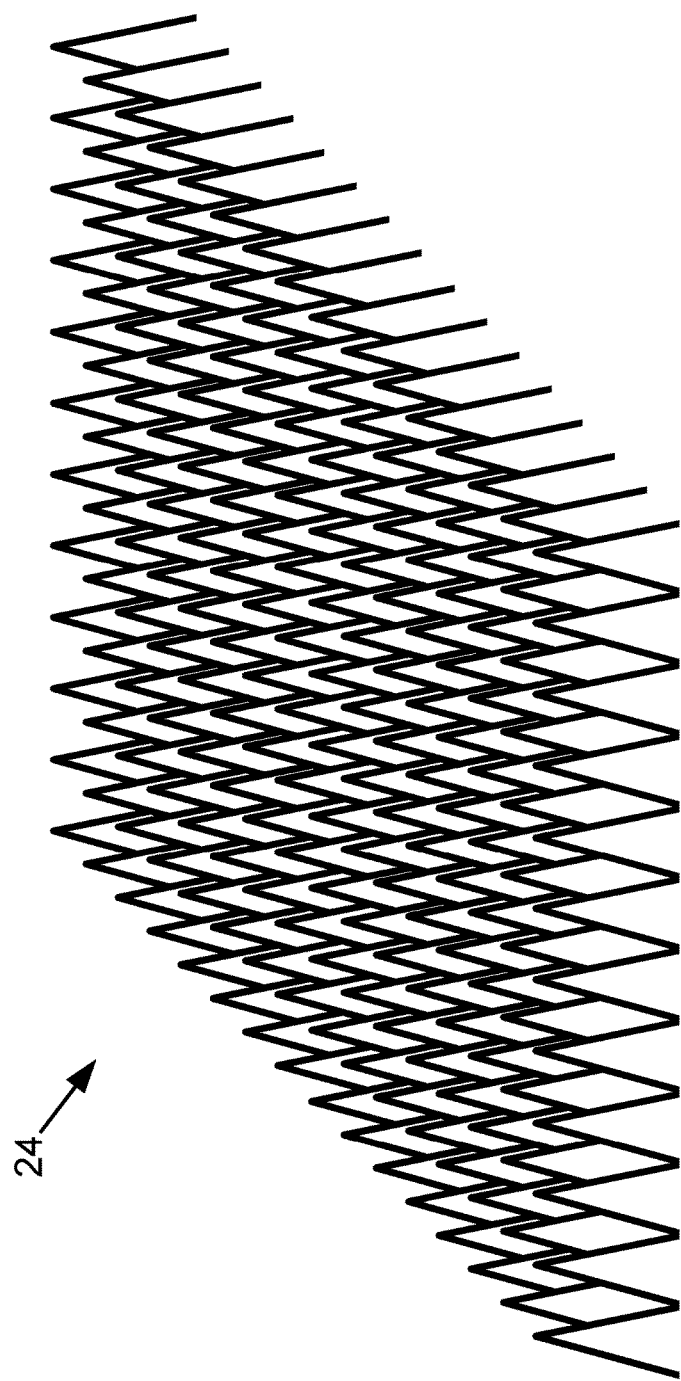
FIG. 3 diagrammatically shows a perspective view of the surface nanostructures of the phosphor element of FIGS. 1 and 2.

With continuing reference to FIG. 1 and with further reference to FIGS. 2 and 3, the phosphor element 14 includes surface nanostructures 24 on (or formed into) the front side of the phosphor element 14 from which the phosphorescence is emitted (that is, disposed on a phosphorescence-emitting surface 25). With particular reference to FIG. 2, which shows an isolation view of the phosphor element 14 (with any backside reflection coating 20 omitted), and with more particular reference to Inset A shown in FIG. 2, the surface nanostructures 24 are cone-shaped or have cone-shaped tapering. As seen in the perspective view of FIG. 3, the illustrative surface nanostructures 24 form a two-dimensional pattern.

The illustrative surface nanostructures have lateral dimension T in two dimensions, and vertical dimension (height) H.

In some embodiments, the surface nanostructures are periodic in two dimensions so that lateral dimension T can be viewed as a lateral period of the two-dimensional periodic surface nanostructures; however, periodicity is not required to provide the desired gradual transition of the effective refractive index for enhancing phosphorescence optical power output. Similarly, the illustrative surface nanostructures 24 have uniform height H, but again this is not required to provide the desired gradual change in effective refractive index over the height H of the surface nanostructures 24 for enhancing phosphorescence optical power output through the phosphorescence-emitting surface 25.

In some embodiments, the surface nanostructures are non-periodically distributed in two dimensions (rather than being periodic in two lateral dimensions as in FIG. 3). In such embodiments, the lateral dimension T is suitably a statistical average spacing between adjacent surface nanostructures, and the variance of the spacing between adjacent surface nanostructures is preferably relatively small (e.g. variance of T being substantially smaller than T itself). In some embodiments, the surface nanostructures are of non-uniform height (rather than being of uniform height). In such embodiments, the vertical dimension H is suitably a statistical average height, and the height variance is preferably relatively small (e.g. variance of H being substantially smaller than H itself). In some embodiments both the lateral spacing and height are random as just described.

Regarding the lateral dimension T, this is preferably about the same in both directions of the two-dimensional pattern. However, in some embodiments it is contemplated for the lateral dimension T to be different in the two directions (e.g. different values $T_x$ and $T_y$ in defined mutually orthogonal x- and y-directions along the phosphorescence-emitting surface 25). Typically, it will be desired for $T_x$ and $T_y$ to be at least approximately equal. If $T_x$ and $T_y$ are very different from one another, this could lead to optical emission anisotropy—for some applications, however, such emission anisotropy might be desirable.

For phosphorescence in the near-ultraviolet, visible, or near-infrared range, the free space wavelength is on the order of 300 nm to a few microns, so that the nanostructure lateral dimension T is preferably between 50 nm and 2 microns inclusive. In general, T should be smaller than the phosphorescence wavelength. The height H determines the distance over which the effective refractive index gradually changes from the refractive index $n_e$ of the host material $14_2$ of the phosphor element 14 (e.g., on the order of 1.3-2.0 for typical host materials, although a value for $n_e$ outside this range is contemplated) to the refractive index $n_0$=1.00 of air. In general, a larger value of H is preferable; however, if H is too large then the very tall surface nanostructures may be prone to damage. In some suitable embodiments, H is at least 100 nm. In some embodiments H is in the range 100 nm to 20 microns inclusive, although values of H outside this range are contemplated.

With reference to FIGS. 4 and 5, the surface nanostructures can have tapered shapes other than the sharply peaked conical shapes of the illustrative surface nanostructures 24 of FIGS. 1-3. For example, FIG. 4 shows another embodiment in which surface nanostructures 24r are conical but have rounded peaks, or (depending on the detailed curvature) are rounded bumps. FIG. 5 shows another embodiment in which surface nanostructures 24fc are frustoconical in shape and have flat tops. It will also be appreciated that the surface nanostructures can have various rotational symmetries or can have no rotational symmetry. For example, the surface nanostructures may be circular cones, six-sided (hexagonal) cones, irregular cones, or so forth.

Figure 6:
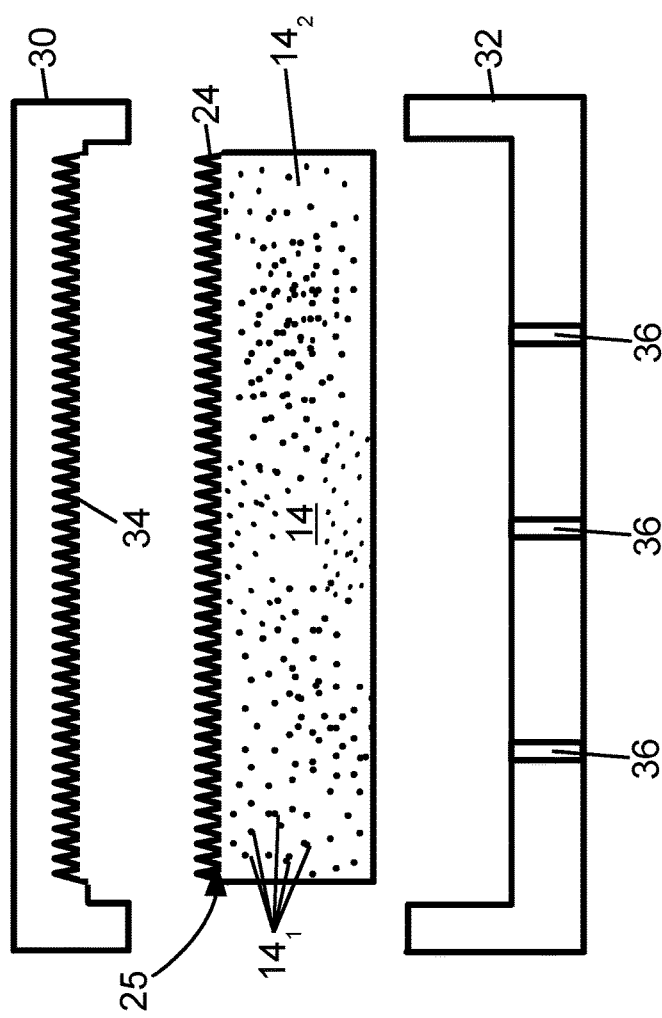
FIG. 6 diagrammatically shows a mold suitably used to form the illustrative phosphor element described with reference to FIGS. 1-3 in some illustrative manufacturing embodiments in which the surface nanostructures are formed integrally during the injection molding process.

With reference to FIG. 6, in one illustrative manufacturing embodiment the phosphor element 14 is manufactured by injection molding and the surface nanostructures 24 are integrally formed during the injection molding by way of the mold incorporating the desired surface nanostructures. FIG. 6 shows an illustrative example for forming the phosphor element 14 with the surface nanostructures 24 using a clamshell mold comprising a frontside mold piece 30 and a backside mold piece 32. The frontside mold piece 30 includes nano-features 34 that define the surface nanostructures 24. To perform the injection molding, the two mold pieces 30, 32 are put together and molding material (that is, the host material $14_2$ such as silicone with dispersed phosphor $14_1$) is injected into the mold via openings 36. (The injection openings 36 are shown in the backside mold piece 32, but additionally or alternatively could be in the frontside mold piece.) The injection molding is generally performed at an elevated temperature (compared with room temperature~25° C.) so that the material is a flowing material (e.g. a viscous fluid) that flows into and conforms with the nano-features 34 to define the surface nanostructures 24. The material is cooled in the closed mold to form the phosphor element 14, with the nano-features 34 defining the surface nanostructures 24. FIG. 6 shows the mold 30, 32 after completing the injection molding, with the clamshell mold 30, 32 opened to remove the molded phosphor element 14. In some injection molding processes, a subsequent curing process may be performed to harden the injection-molded phosphor element 14.

The approach of FIG. 6 in which the surface nanostructures are formed integrally with the injection molding process is convenient. However, other approaches may be used to form the surface nanostructures, such as photolithography, laser writing, chemical or electro-chemical etching, or so forth. The surface nanostructures 24 are made of the same host material $14_2$ that defines the shape of the phosphor element 14 and the surface nanostructures 24 are part of the overall shape of the phosphor element 14. Hence, there is no issue with adhesion of a different material to the phosphor element 14, as is the case for an AR coating that must adhere to the phosphor element. In another fabrication approach, the surface nanostructures 24 are contemplated to be fabricated on a separate thin membrane (not shown), which may be made of the host material $14_2$ or of a different material whose refractive index is well matched to that of the host material. This membrane with the surface nanostructures is then attached to the phosphorescence-emitting surface 25. If the membrane is made of the host material then the attachment of the membrane to the phosphorescence-emitting surface 25 is advantageously a cohesion process which ensures chemical compatibility. Regardless of the fabrication approach, in embodiments in which the surface nanostructures 24 comprise the host material $14_2$ they may, or may not, include the dispersed phosphor $14_1$. For example, in the embodiment of FIG. 6 the surface nanostructures 24 will inherently include the phosphor $14_1$ they are injection molded integrally with the rest of the phosphor element 14; whereas, if the surface nanostructures 24 are fabricated on a separate membrane of the host material then that membrane may optionally not include dispersed phosphor.

In the illustrative embodiments, there is no anti-reflection (AR) coating disposed on the phosphorescence-emitting surface 25. This is typically preferred since the surface nanostructures 24 are typically most effectively employed in conjunction with phosphor elements for which an AR coating is not readily formed on the phosphorescence-emitting surface 25. However, it is contemplated to combine an AR coating with the surface nanostructures 24, e.g. by disposing the AR coating over the surface nanostructures 24.

It will be appreciated that various of the above-disclosed and other features and functions, or alternatives thereof, may be desirably combined into many other different systems or applications. It will be further appreciated that various presently unforeseen or unanticipated alternatives, modifications, variations or improvements therein may be subsequently made by those skilled in the art which are also intended to be encompassed by the following claims.

The invention claimed is:

1. A phosphor element comprising:
a host material defining the shape of the phosphor element; and
one or more phosphors dispersed in the host material that emit phosphorescence in response to an optical pump beam;
wherein the phosphor element has a phosphorescence-emitting surface with surface nanostructures comprising the host material; and
wherein the surface nanostructures have a lateral dimension along the phosphorescence-emitting surface of between 50 nanometers and 2 microns inclusive wherein the lateral dimension is a statistical average spacing between adjacent surface nanostructures.

2. The phosphor element of claim 1, wherein the surface nanostructures are tapered conical surface nanostructures, frustoconical surface nanostructures, or rounded bump surface nanostructures.

3. The phosphor element of claim 1, wherein the surface nanostructures provide a gradual change in effective refractive index that enhances phosphorescence transmission through the phosphorescence-emitting surface.

4. The phosphor element of claim 1, wherein the surface nanostructures are laterally periodic in two dimensions over the phosphorescence-emitting surface and the lateral dimension is the periodicity of the surface nanostructures.

5. The phosphor element of claim 1, wherein the surface nanostructures are non-periodically distributed in two dimensions over the phosphorescence-emitting surface and the lateral dimension is the statistical average spacing between adjacent surface nanostructures.

6. The phosphor element of claim 1, wherein the surface nanostructures have a vertical height dimension of at least 100 nanometers.

7. The phosphor element of claim 1, wherein no anti-reflection coating is disposed on the phosphorescence-emitting surface.

8. The phosphor element of claim 1, further comprising:
a reflective coating disposed on a back surface of the phosphor element opposite from the phosphorescence-emitting surface.

9. The phosphor element of claim 1, wherein the host material is silicone.

10. The phosphor element of claim 1, wherein the host material is a transparent or translucent thermoplastic resin.

11. The phosphor element of claim 1, wherein the one or more phosphors dispersed in the host material include one or more of yttrium aluminum garnet (YAG), cerium-doped YAG (YAG:Ce), lutetium YAG (LuYAG), silicate-based phosphors, and silicon-aluminum-oxynitride (SiAlON).

12. The phosphor element of claim 6, wherein the surface nanostructures have a vertical height dimension of between 100 nanometers and 20 microns inclusive.

13. The phosphor element of claim 6, wherein the surface nanostructures are of uniform height and the vertical height dimension is the uniform vertical height of the surface nanostructures.

14. The phosphor element of claim 6, wherein the surface nanostructures are of non-uniform height and the vertical height dimension is the statistical average height of the surface nanostructures.

15. A phosphor wheel device comprising:
a metal wheel having a central axis via which the metal wheel is rotatable; and
one or more phosphor elements disposed along a rim of the metal wheel and secured to the metal wheel;
wherein each phosphor element is an arc segment phosphor element or the one or more of phosphor elements consist of a single annular phosphor element; and
wherein the one or more phosphor elements comprise:
a host material defining the shape of the phosphor element; and
one or more phosphors dispersed in the host material that emit phosphorescence in response to an optical pump beam;
wherein the phosphor element has a phosphorescence-emitting surface with surface nanostructures comprising the host material, the surface nanostructures comprising the host material being of non-uniform height and having a statistical average height of at least 100 nanometers.

16. The phosphor wheel of claim 15 wherein the surface nanostructures have a lateral dimension along the phosphorescence-emitting surface of between 50 nanometers and 2 microns inclusive wherein the lateral dimension is a statistical average spacing between adjacent surface nanostructures.

17. A method of manufacturing a phosphor element comprising:
injection molding the phosphor element by injecting a host material with one or more dispersed phosphors into a mold, wherein the mold defines the shape of the injection molded phosphor element;
wherein the mold includes nano-features that define surface nanostructures on a phosphorescence-emitting surface of the injection-molded phosphor element, the nano-features having a lateral dimension along the phosphorescence-emitting surface of between 50 nanometers and 2 microns inclusive wherein the lateral dimension is a statistical average spacing between adjacent surface nanostructures.

18. A light emission method comprising:
applying a pump optical beam to a phosphor element whereby one or more phosphors dispersed in a host material of the phosphor element emit phosphorescence in response to an optical pump beam; and
transmitting the phosphorescence through a phosphorescence-emitting surface of the phosphor element; and
enhancing the transmitting using surface nanostructures comprising the host material which are disposed on the phosphorescence-emitting surface and which have a lateral dimension along the phosphorescence-emitting surface of between 50 nanometers and 2 microns inclusive wherein the lateral dimension is a statistical average spacing between adjacent surface nanostructures.

19. The light emission method of claim 18, wherein the enhancing comprises:
providing a gradual change in effective refractive index at the phosphorescence-emitting surface that gradually changes from a refractive index of the host material to a refractive index of 1.00 over the height of the surface nanostructures.

* * * * *